United States Patent
Zhu et al.

(10) Patent No.: US 10,642,779 B2
(45) Date of Patent: May 5, 2020

(54) GROUP-BASED DATA REPLICATION IN MULTI-TENANT STORAGE SYSTEMS

(71) Applicant: Microsoft Technology Licensing, LLC, Redmond, WA (US)

(72) Inventors: Yibo Zhu, Kirkland, WA (US); Jitendra D. Padhye, Redmond, WA (US); Hongqiang Liu, Woodinville, WA (US); Shachar Raindel, Redmond, WA (US); Daehyeok Kim, Pittsburgh, PA (US); Anirudh Badam, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 15/936,267

(22) Filed: Mar. 26, 2018

(65) Prior Publication Data
US 2019/0294582 A1  Sep. 26, 2019

(51) Int. Cl.
*G06F 16/27* (2019.01)
*G06F 15/167* (2006.01)
(Continued)

(52) U.S. Cl.
CPC ............ *G06F 15/167* (2013.01); *G06F 3/061* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS

2007/0226750 A1\* 9/2007 Sharp ................. H04L 67/1097
719/313
2009/0049259 A1\* 2/2009 Sudhakar ............ G06F 11/1471
711/162

(Continued)

OTHER PUBLICATIONS

"Information Technology—SCSI RDMA Protocol (SRP) ernal", Retrieved From http://www.csit-sun.pub.ro/~cpop/Documentatie_SMP/Standarde_magistrale/SCSI/srp-r16a.pdf, Jul. 3, 2002, 83 Pages.

(Continued)

*Primary Examiner* — Clayton R Williams
*Assistant Examiner* — Christopher B Robinson
(74) *Attorney, Agent, or Firm* — Liang IP, PLLC

(57) ABSTRACT

Distributed storage systems, devices, and associated methods of data replication are disclosed herein. In one embodiment, a server in a distributed storage system is configured to write, with an RDMA enabled NIC, a block of data from a memory of the server to a memory at another server via an RDMA network. Upon completion of writing the block of data to the another server, the server can also send metadata representing a memory location and a data size of the written block of data in the memory of the another server via the RDMA network. The sent metadata is to be written into a memory location containing data representing a memory descriptor that is a part of a data structure representing a pre-posted work request configured to write a copy of the block of data from the another server to an additional server via the RDMA network.

20 Claims, 13 Drawing Sheets

(51) Int. Cl.
   *H04L 29/08*      (2006.01)
   *G06F 3/06*       (2006.01)
(52) U.S. Cl.
   CPC ............ *G06F 3/0619* (2013.01); *G06F 16/27* (2019.01); *H04L 67/1095* (2013.01); *H04L 67/1097* (2013.01)

(56) References Cited

U.S. PATENT DOCUMENTS

| | | |
|---|---|---|
| 2009/0106771 A1 | 4/2009 | Benner et al. |
| 2012/0130950 A1 | 5/2012 | Jain et al. |
| 2012/0265837 A1* | 10/2012 | Grant .................... H04L 67/025 709/212 |
| 2015/0012607 A1* | 1/2015 | Cayton ............... H04L 67/1097 709/212 |
| 2017/0034268 A1* | 2/2017 | Govind ............... H04L 67/1097 |
| 2019/0087104 A1* | 3/2019 | Singh ................... G06F 3/0619 |

OTHER PUBLICATIONS

"International Search Report and Written Opinion Issued in PCT Application No. PCT/US19/022835", dated Jun. 3, 2019, 16 Pages.
Schneider, et al., "Protocols for Fully Offloaded Collective Operations on Accelerated Network Adapters", In Proceeding of 42nd International Conference on Parallel Processing, Oct. 1, 2013, pp. 593-602.

* cited by examiner

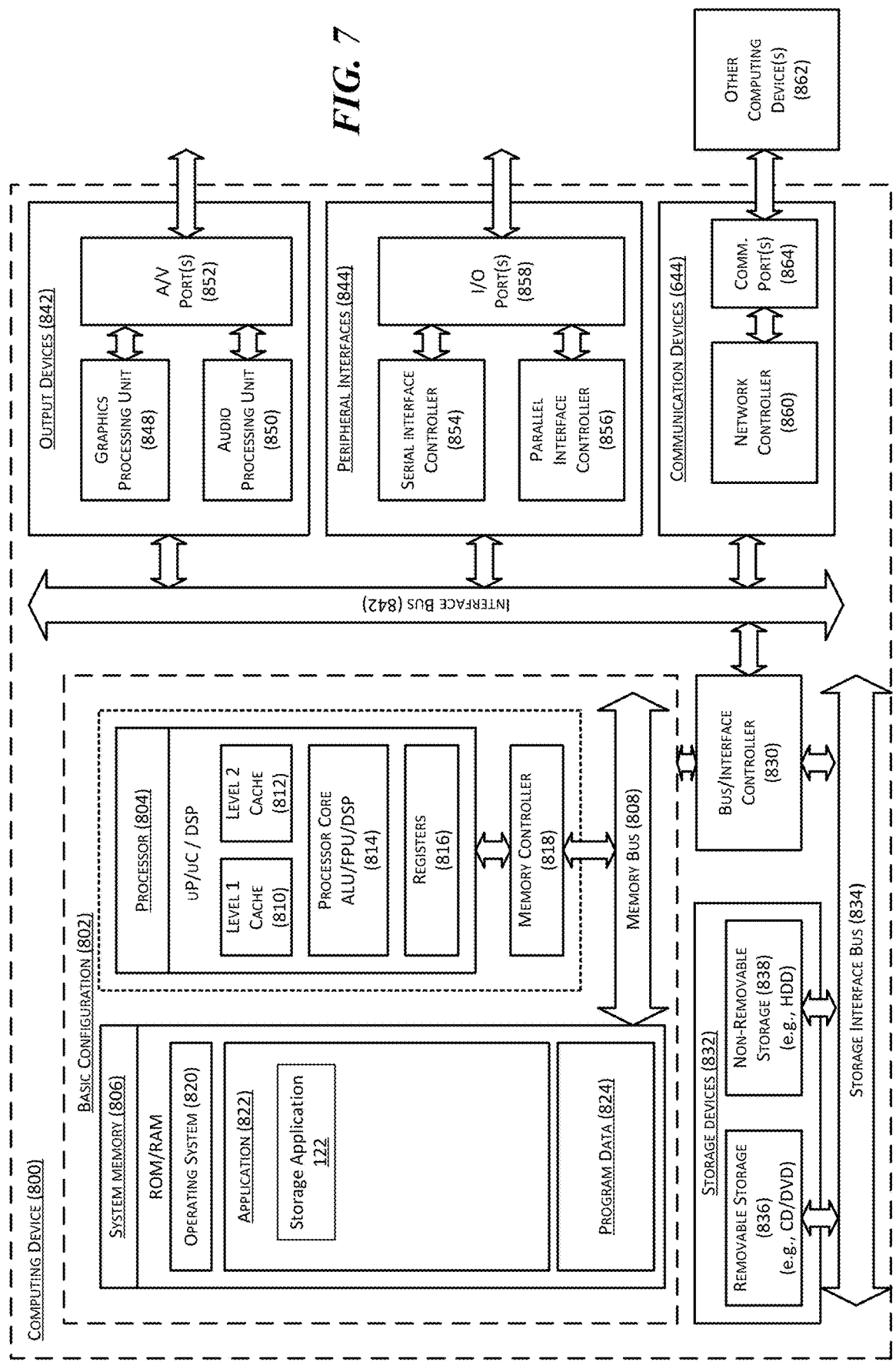

GROUP-BASED DATA REPLICATION IN MULTI-TENANT STORAGE SYSTEMS

BACKGROUND

Distributed storage systems typically include routers, switches, bridges, and other physical network devices that interconnect a large number of servers, network storage devices, and other types of computing devices via wired or wireless network links. The individual servers can host one or more virtual machines, containers, or other types of virtualized components to provide various cloud computing services accessible to users or tenants. For example, the individual servers be configured to provide data storage services to multiple users or tenants. Users may access such data storage services through a co-located cloud computing service, a web application programming interface (API), or via applications that utilize such a web API.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Distributed storage systems are important building blocks for modern online computing services. To protect data availability and integrity, distributed storage systems typically maintain multiple copies or replicas of each stored data object on different servers or storage nodes. Distributed storage systems also rely on replicated transactions to ensure consistent and atomic application of updates to all copies of stored data objects. Such replicated transactions, however, can incur large and unpredictable processing latencies, and thus impact the overall performance of distributed storage systems and corresponding storage services.

Several techniques have been developed in order to address the foregoing difficulties. For example, one technique involves applying remote direct memory access (RDMA) for networking operations during replicated transactions in distributed storage systems. RDMA involves utilizing a network adapter (e.g., a network interface card or "NIC") to directly transfer data to/from an application memory, and thus eliminating copying data between the application memory and a data buffer in an operating system (OS). Another technique involves integrating non-volatile memory (NVM) to bypass a storage stack of an OS for reducing storage processing latencies.

While the foregoing techniques may improve performance of standalone storage servers, such techniques may be unable to provide low and predictable latencies for replicated transactions in multi-tenant distributed storage systems. For example, the foregoing techniques typically rely on a CPU of a server for input/output (I/O) polling. In a multi-tenant distributed storage system, however, such CPU reliance may incur significant costs in terms of processing delays due to processing demands placed on the CPU by various tenants.

Secondly, even without I/O polling, a CPU of a server is typically involved in many operations during a replicated transaction on the server. During RDMA operations, a CPU is usually used to achieve one or more of atomicity, consistency, isolation, and durability (ACID) of the stored data objects. For instance, a CPU can be utilized for (i) logging data updates ("logs" or "storage logs") to data objects, processing records of logs, and truncating logs to ensure that modifications in a replicated transaction occur atomically (i.e., all or nothing); (ii) running a consistency protocol to ensure all replicas reach identical states before sending an acknowledgement notification (ACK) to a storage application; (iii) locking all replicas for isolation between different replicated transactions; iv) and/or ensuring that any replicated data from a network stack reach a durable storage medium before sending an ACK.

To ensure the foregoing ACID properties, replicated transactions are typically paused for a CPU to finish some of the tasks discussed above at each replication stage. Unfortunately, in a multi-tenant distributed storage system, hundreds or even thousands of storage instances (e.g., database instances) may be co-located on a single storage node. In such distributed storage systems, a CPU of a server is likely to perform frequent switches of processes or context. As such, replicated transactions on the server can have high processing latency and unpredictable performances due to CPU delays.

Several embodiments of the disclosed technology are directed to improve predictability and reduce latency of data replication in distributed storage systems by reducing or even eliminating workloads placed on CPUs of storage nodes holding replicates during replicated transactions. Storage nodes holding replicates are referred to herein as "replica storage nodes" in contrast to "primary storage node" that initiates an replicated transaction. Operations or tasks that previously performed by a CPU on a replica storage node can be offloaded to one or more RDMA enabled NICs (RNICs) coupled to one or more NVMs for storage. In certain implementations, group-based NIC offloading functions or primitives for NVM access are provided. Utilizing such primitives, the originating storage node can perform logically identical memory operations on data objects stored in a group of replica storage nodes without involving CPUs of the replica storage nodes. As such, predictable and efficient replicated transaction performance can be achieved with low or even no CPU usage on the replica storage nodes.

To achieve the foregoing technical effects, one aspect of the disclosed technology is directed to a technique for pre-posting RDMA data operations, such as a data sending operation (SEND), a data receiving operation (RECV), and a data writing operation (WRITE) with an RDMA conditional execution operation, i.e., WAIT, that causes an RNIC to wait for certain events before executing corresponding RDMA data operations in a working queue. For example, an RNIC can be pre-posted a WAIT followed by a WRITE conditioned on a RECV in a working queue of the RNIC. Thus, the WAIT is conditioned on the RECV, and the WRITE is after the WAIT in the FIFO working queue, and thus blocked by or conditioned on the WAIT. In operation, once the RNIC completes the RECV, the WAIT can be automatically triggered at the RNIC to allow execution of the pre-posed WRITE to write a block of data to another replica storage node via an RDMA network.

Another aspect of the disclosed technology is directed to a technique for allowing an RNIC at one storage node to enqueue or modify parameters of RDMA data operations on other RNICs at other storage nodes. In certain implementations, NIC drivers at each storage node can register a memory region (referred to as a "metadata region") that is RDMA-accessible from one or more other NICs in a replication storage cluster. The metadata region can be configured to hold one or more working queues each containing various RDMA data operations and/or RDMA conditional execution operations. As such, an RNIC at a first storage node can thus enqueue RDMA data operations in a second RNIC of a second storage node. The second RNIC can also perform enqueueing RDMA data operations in a third RNIC of a third storage node. By combining the foregoing two techniques, an RNIC at one storage node can program a group of other RNICs at additional storage nodes to perform replicated transactions, as described in more detail below.

In one implementation, a primary storage node can be configured to replicate data to one or more replica storage nodes in a replication group in a daisy chain fashion. The primary storage node can include a first RNIC having a working queue with a WRITE and a SEND. The WRITE can be configured to write a block of data (e.g., 512 KB) from a memory location in a memory of the primary storage node to another memory location in another memory at a replica storage node via a second RNIC. The replica storage node can include a RECV in a first working queue and a sequence of WAIT, WRITE, and SEND in a second working queue. The RECV is operatively coupled to the WAIT such that a completion of the RECV in the first working queue triggers the WRITE and SENDs in the second working queue.

In operation, the first RNIC executes the WRITE in the corresponding working queue to write the block of data to the memory location in the memory at the replica storage node. The first RNIC then executes the SEND to send metadata of the written block of data to the second RNIC. The metadata can include a memory location (e.g., memory address) and a data length (e.g., in kilobytes, megabytes, etc.) of the block of data. In response to the SEND from the first RNIC, the second RNIC executes the RECV in the first working queue to receive the metadata and updates parameters (e.g., memory descriptors) the WRITE and SEND in the second working queue according to the received metadata. Upon a completion of the RECV in the first working queue, the WAIT in the second working queue is automatically triggered. Upon triggering the WAIT, the second RNIC at the replica storage node can perform the WRITE in the second working queue to write a copy of the block of data from the memory location identified by the metadata from the replica storage node to another replica storage node. Once the WRITE is executed, the replica storage node can then execute the SEND in the second working queue to send additional metadata of the block of data to the another replica storage node to trigger additional WRITE and SEND operations at that replica storage node, as described above As such, by sequentially performing the WRITEs for writing the block of data and SENDs for sending the metadata of the written block of data, the block of data can be replicated in a daisy chain fashion in replication group without imposing much workloads on CPUs of the replica storage nodes. Several example experiments conducted with implementations of the foregoing techniques showed a 79% reduction of data insertion/update operations and a reduction of 81% in a gap between an average and 99th percentile latencies of data replication while CPU usage on the replica storage nodes went down from generally fully utilized to nearly 0%. Thus, by offloading replicated transactions from the CPUs of the replica storage nodes to corresponding RNICs, latency of replicated transactions as well as workloads on CPUs of replica storage nodes both can be reduced in the replica group when compared to other replications techniques.

BRIEF DESCRIPTION OF THE DRAWINGS

FIG. 7 is a computing device suitable for certain components of the distributed storage system in FIG. 1.

DETAILED DESCRIPTION

Figure 1:
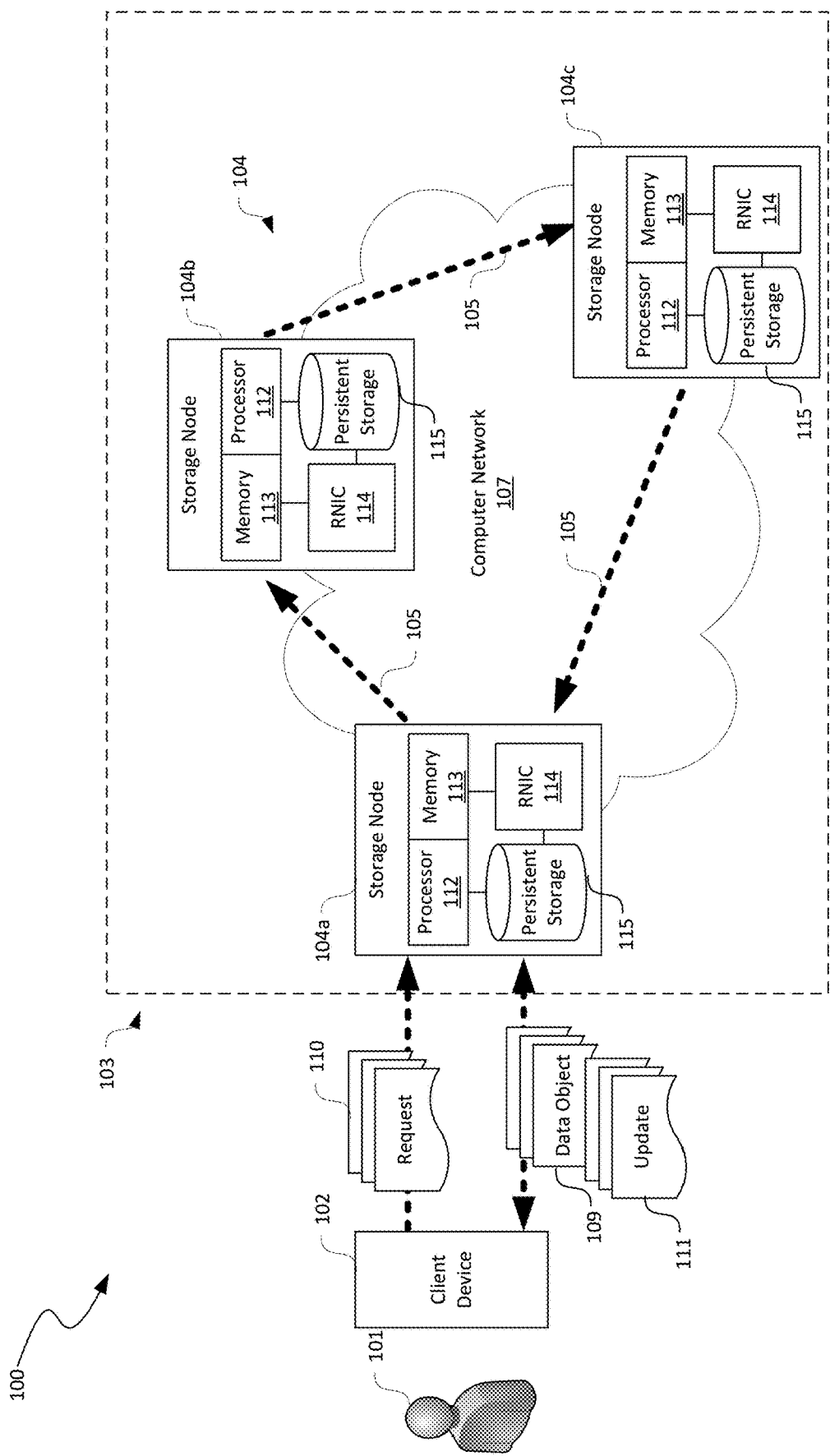
FIG. 1 is a schematic diagram illustrating a distributed storage system implementing group-based data replication in accordance with embodiments of the disclosed technology.

Certain embodiments of systems, devices, components, modules, routines, data structures, and processes for group-based data replication in datacenters or other suitable distributed storage systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, the term "distributed storage system" generally refers to an interconnected computer system having multiple network nodes that interconnect a plurality of servers or storage nodes to one another and/or to external networks (e.g., the Internet). The individual servers or storage nodes can include one or more persistent storage devices. The individual servers or storage nodes can also be configured to perform replicated transactions as described herein without incurring much CPU usage on storage nodes holding replicas. The term "network node" generally refers to a physical network device. Example network nodes include routers, switches, hubs, bridges, load balancers, security gateways, or firewalls. A "storage node" generally refers to a physical computing device configured to implement, for instance, one or more virtual machines, virtual switches, virtual disks, or other suitable virtualized components. For example, a storage node can include a server having a hypervisor configured to support one or more virtual storage devices, virtual machines, virtual switches or other suitable types of virtual components. Several storage nodes can be logically linked, for example, in a chain, to form a "replication group."

Also used herein, a "primary storage node" generally refers to a storage node configured to interface with a user or tenant. A primary storage node can be configured to receive a request from the user for modifying or updating a data object stored in a replication group. A primary storage node can also be configured to initiate a replicated transaction to create and store additional copies of the update on additional storage nodes in the replication group. The additional copies are generally referred to herein as "replicas" while the additional storage nodes holding replicas are referred to as "replica storage nodes."

Further, as used herein, remote direct memory access (RDMA) generally refers to a technique that allows a computer, a virtual machine, an application, or an application service to directly access memory locations of a remote computer via a computer network without involving operating system on either endpoints. An RDMA connection can allow ultra-low network latency communications (e.g., less than 25 μs) between computers. RDMA can also have low CPU utilization and high bandwidth on individual connections. RDMA can be implemented in various manners. In one example, RDMA can be implemented using hardware components such as hardware connection adapters (HCAs) or other RDMA enabled network interface cards (RNICs) to process RDMA traffic using queue pairs (QPs) and completion queues (CQs). A queue pair can include a write working queue and a corresponding read working queue. RDMA networking can offer higher throughput, lower latency, and lower CPU utilization than TCP/IP based networking.

The term a "working queue" generally refers to a data structure representing a sequence of RDMA operations or "work requests" that are to be processed by an RNIC in a first-in-first-out fashion. Example work requests can include either one-sided or two-sided operations. An example one-sided work request includes a WRITE work request that writes a block of data from a first RNIC directly to a memory of a remote storage node via a second RNIC. Two-sided work requests need operations from both endpoints of an RDMA connection to complete a transaction. For example, a SEND from a first RDMA endpoint can transmit a block of data to a second RDMA endpoint that has a RECV work request corresponding to the SEND in the first RDMA endpoint. The RECV can receive the block of data, allocate a memory location for the block of data, and place the block of data into the allocated memory location before indicating the SEND-RECV transaction is completed.

A work request can include a data structure having one or more memory descriptors or parameters contained in a working queue. For example, a WRITE can include memory descriptors configured to store data representing a memory address of a block of data to write, a size of the block of data, a destination memory address to write to, and/or other suitable information. Enqueuing a work request in a working queue is referred to as "posting" the work request to the working queue. In accordance with embodiments of the disclosed technology, work requests can be "pre-posted" in a working queue before initiation of a replicated transaction that consumes the work requests. Work requests can be posted by a NIC driver or other suitable software components executing by a processor of a storage node.

An RNIC can monitor for any work requests in a corresponding working queue and immediately execute the work requests in sequence unless a conditional execution work request, i.e., WAIT is encountered. A WAIT work request can be logically configured to be linked to another work request in another working queue. Completion of the another work request automatically triggers the RNIC to execute a further work request following the WAIT in the working queue. For example, A WAIT can be linked to a RECV in another working queue. Once the RECV is completed, the RNIC automatically triggers the WAIT to execute another work request, e.g., a WRITE, SEND, etc., that follows the WAIT. Thus, pre-posting work requests such as WRITE, SEND, etc. after a WAIT in a working queue can prevent the RNIC from immediately executing the WRITE, SEND, etc.

Replicated storage systems, for example, block stores, key-value stores, and databases, typically maintain multiple copies of stored data objects in order to avoid loss of data during power or other system failures. Chain replication is a form of primary-backup replication to create and maintain multiple copies of data objects. In chain replication, the replica storage nodes are logically arranged in a linear chain. Writes begin at the head of a chain (e.g., a primary storage node) and propagate down the chain in a first phase. The head of the chain begins executing a transaction and readies the transaction to commit by creating a local log entry and enacting suitable locks. Only then, the head of the chain forwards the transaction to the next storage node in the chain, which repeats the operations and forwards the transaction down the chain. When the tail of the chain receives the request, the tail sends an ACK that propagates back to the head. Every storage node gets the ACK, and commits the transaction in response. Finally, the head gets the ACK and sends a transaction ACK to an application that requested the change indicating the chance has been applied.

When performing chain or other suitable types of replication, distributed storage systems typically use some protocols to ensure that every update or change to a data object is applied to enough replicas to sustain availability and durability. Such protocols include mechanisms to make identical changes to multiple replicas before indicating that the data update is durable and becomes available for data consumers. Applying such changes is typically structured as an atomic transaction including a set of read and write operations. For instance, a transaction might modify data objects X and Y in a dataset. The transaction is atomic when changes to both X and Y are applied, and thus avoiding only changing one of X or Y.

Storage nodes can perform a number of sub-operations per change of a data object. For example, in certain implementations, distributed storage systems can use logging (undo/redo/write-ahead) to achieve atomicity. New values of data objects are first written to a log or storage log and later the data objects are modified one by one according to the log. If the modifications are paused for any reason, then simply re-applying the new values from the log can ensure atomicity. Further, while processing the log, a storage node holding a replica can block other transactions from the data objects involved by implemented locks. For instance, in the above example, the distributed storage system can lock objects X and Y while processing the log.

A slowdown in any of the foregoing sub-operations, however, can slow down the entire replicated transaction, and thus causing unacceptable processing delays for replicated transactions. In particular, in multi-tenant distributed storage systems, processing delays from CPUs can cause data replication to be non-responsive, chain replication or otherwise. A thread (i.e., a sequence of programmed instructions) on a replica storage node is typically scheduled on a CPU of the replica storage node in order to receive a log via a network stack, and subsequently store the log via the storage stack. The thread also participates in a two-phase commit protocol and in a chain (or another type of) replication scheme. The thread then processes the log and updates the actual data object according to the log.

In multi-tenant distributed storage systems, CPUs are shared across multiple tenants each executing one or more processes. Such execution sharing can lead to heavy CPU loads at times, and causing unpredictable scheduling latency. Delays for being scheduled to run on a CPU can cause inflated latencies for writes that are waiting for ACKs or locks. The problem is further exacerbated by data partitioning. To increase server resource utilization, large-scale distributed storage systems typically divide stored data into smaller partitions such that each server stores portions or partitions of numerous tenants. For instance, an online database partition can range between 5 GB to 50 GB of storage space while typical servers have 4 TB to 8 TB of storage space. Thus, each server hosts hundreds of tenants translating to hundreds of replica transaction processes because each tenant is isolated in at least one process. Such large numbers of processes easily saturate CPUs at storage nodes and causing high latency.

Several embodiments of the disclosed technology can address at least some of the foregoing difficulties by offloading certain operations of replicated transactions to RNICs of replica storage nodes in order to reduce or avoid CPU involvement on a critical path of data replication. In accordance with embodiments of the disclosed technology, CPUs on replica storage nodes only spend very few cycles to initialize the disclosed group-based replication processes, and then are generally not involved in subsequent replicated transaction operations. Instead, the RNICs by themselves can perform the operations that previously ran on the CPUs, e.g., to modify data in NVM. In the following description, embodiments of the disclosed technology are described as a mechanism for offloading replicated transactional operations to RNICs for chain replication. However, several embodiments of the disclosed technology can also be implemented in other replication techniques, non-ACID systems, and a variety of consistency models.

One challenge of offloading replicated transactional operations to RNICs is to use RNICs to perform tasks such as log processing without CPUs. To address this challenge, several embodiments of the disclosed technology are directed to providing a set of group-based RDMA primitives instead of end-to-end RDMA. Examples of such operations during a replicated transaction offloaded to RNICs can include 1) replicating operation logs to all replicas and ensure every replica is ready to commit; 2) acquiring a lock on every replica; 3) executing transactions in operation logs; and 4) flushing all caches (if applicable) to make the transactions durable; and 5) releasing the lock.

By offloading the foregoing operations to the RNICs, several embodiments of the disclosed technology can reduce or even eliminate processing workloads placed on CPUs of replica storage nodes during replicated transactions. Utilizing the group-based primitives disclosed herein, logically identical memory data operations can be performed on replicas without involving CPUs of the replica storage nodes. As such, predictable and efficient replication performance can be achieved with nearly no CPU usage on the replica storage nodes holding replicas, as described in more detail below with reference to FIGS. 1-7.

FIG. 1 is a schematic diagram illustrating a distributed storage system 100 implementing group-based data replication in accordance with embodiments of the disclosed technology. As shown in FIG. 1, the distributed storage system 100 can include a client device 102 corresponding to a user 101 and a computing fabric 103 interconnected to the client device 102 by a computer network (not shown) such as the Internet. Even though particular components of the distributed storage system 100 are shown in FIG. 1, in other embodiments, the distributed storage system 100 can also include additional and/or different components or arrangements. For example, in certain embodiments, the distributed storage system 100 can also include additional network storage devices, network devices, hosts, and/or other suitable components (not shown) in other suitable configurations.

The client device 102 can include a computing device that facilitates the user 101 to access cloud storage services provided by the storage nodes 104 via the computer network. In one embodiment, the client device 102 includes a desktop computer. In other embodiments, the client device 102 can also include laptop computers, tablet computers, smartphones, or other suitable computing devices. Though one user 101 is shown in FIG. 1 for illustration purposes, in other embodiments, the distributed storage system 100 can facilitate any suitable numbers of user 101 to access cloud storage or other suitable types of computing services provided by the computing fabric 103 in the distributed storage system 100.

As shown in FIG. 1, the computing fabric 103 can include multiple storage nodes 104 interconnected by a computer network 107. In FIG. 1, three storage nodes 104 (i.e., first, second, and third storage nodes 104a-104c, respectively) are shown as a replication group for illustration purposes. In other embodiments, the computing fabric 103 can also include four, five, six, or any other suitable number of storage nodes 104 in a replication group and/or additional replication groups.

In the illustrated embodiment, the storage nodes 104 of the replication group are configured to be logically interconnected in a ring configuration, as indicated by arrows 105, by, for instance, a storage system controller (not shown). For example, the first storage node 104a is connected to the second storage node 104b, which is connected to the third storage node 104c. The third storage node 104c is then connected to the first storage node 104a to complete a ring. In other embodiments, the storage nodes 104 can also be interconnected in a star or other suitable types of configuration. In FIG. 1 and other figures herein, the first storage node 104a is shown as a primary or "head" storage node while the second and third storage nodes 104b and 104c are shown as replica storage nodes. In particular, the third storage node 104c is shown as a "tail" storage node 104. Such designations, however, are only for convenience of description. In other implementations, the second or third storage node 104b and 104c can also be a primary storage node in addition to or in lieu of the first storage node 104a.

The computer network 107 can include any suitable types of network. For example, in one embodiment, the computer network 107 can include an Ethernet or Fast Ethernet network having routers, switches, load balancers, firewalls, and/or other suitable network components implementing an RDMA over Converged Ethernet (RoCE) protocol. In other embodiments, the computer network 107 can also include an InfiniBand network with corresponding network components. In further embodiments, the computer network 107 can also include a combination of the foregoing and/or other suitable types of computer networks.

As shown in FIG. 1, the individual storage nodes 104 can include a processor 112, a memory 113, an RNIC 114, and a persistent storage 115 operatively coupled to one another. In other embodiments, the storage nodes 104 can also include input/output devices configured to accept input from and provide output to an operator and/or an automated software controller (not shown), or other suitable types of hardware components.

The processor 112 can include a microprocessor, L2/L3 caches, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 112 (e.g., instructions for performing the methods discussed below with reference to FIGS. 5-7). Though only one processor 112 and one memory 113 are shown in the individual storage nodes 104 for illustration, in other embodiments, the individual storage nodes 104 can include two, six, eight, or any other suitable number of processors 112 and/or memories 113.

The RNIC 114 can be configured to facilitate RDMA communications among the storage nodes 104 via the computer network 107. The RNIC 114 can include an RDMA enabled network adapter, a LAN adapter, a physical network interface, or other suitable hardware circuitry and/or firmware to enable communications between pairs of the storage nodes 104 by transmitting/receiving data (e.g., as packets) via a network medium (e.g., fiber optic) according to Ethernet, Fibre Channel, Wi-Fi, or other suitable physical and/or data link layer standards. One example RDMA enabled NIC is a ConnectX®-4 Lx EN Ethernet adapter provided by Mellanox Technologies, Inc. of Sunnyvale, Calif.

The persistent storage 115 can be configured to provide non-volatile storage of data objects for the user 101. The persistent storage 115 can include one or more non-volatile storage devices. For example, the persistent storage 115 can include magnetic disk devices such as flexible disk drives and hard-disk drives (HDD), optical disk drives such as compact disk (CD) drives or digital versatile disk (DVD) drives, solid state drives (SSD), and tape drives. In certain embodiments, the RNIC 114 can be configured to directly access and/or modify data storage in the persistent storage 115 without involving the processor 112. In other embodiments, the persistent storage 115 may be eliminated from the individual storage nodes 104. Instead, the computer fabric 103 can include a centralized storage device (not shown) accessible to all the storage nodes 104.

The individual storage nodes 104 can include suitable instructions executable by the processor 112 to provide a cloud storage service or other suitable computing services to the user 101. For instance, the memory 113 at the first storage node 104a can contain instructions executable by the processor 112 to provide a storage application 122 (shown in FIG. 2A) for facilitating the user 101 with uploading, retrieving, modifying, and/or otherwise managing data objects 109 (e.g., database records) stored in, for instance, the persistent storage 115 of the storage nodes 104. As shown in FIG. 1, in one operation, the user 101 can transmit a request 110 to the first storage node 104a for retrieving a copy of a data object 109. In response, the first storage node 104a can obtain a copy of the requested data object 109 and transmit the copy back to the client device 102.

In another operation, the user 101 can also transmit another request 110 to the first storage node 104a for modifying a stored data object with an update 111 or creating a new data object 109 to be stored in the computing fabric 103. In response to receiving the request 110, the first storage node 104a can store the received update 111 in a local memory location as a storage log 123 (shown in FIG. 2A). The first storage node 104a can then invoking a group write transaction to transmit a copy of the received storage log 123 to the second and third storage node 104b and 104c in a sequential manner.

Once the transmitted storage log 123 is successfully received at the second and third storage nodes 104b and 104c, the third storage node 104c can provide an acknowledgement notification (ACK) to the first storage node 104a. In response to the ACK, the first storage node 104a can invoke a group memory copy transaction to commit the storage log 123 to the local copies of the corresponding data object 109. The first storage node 104a can then respond to the user 101 that the update 111 has been received and stored in the distributed storage system 100. During the group write and memory copy transactions, the processor 112 at the second and third storage nodes 104b and 104c are generally not used for facilitating operations of these transactions. Instead, operations of such replicated transactions are performed by the RNIC 114, and thus removing the processors 112 at the replica storage nodes as a bottleneck for performing replicated transactions in the replication group. Example operations of certain group-based replicated transactions are described below in more detail with reference to FIGS. 2A-4C.

FIGS. 2A-2D are schematic diagrams illustrating certain hardware/software components of the distributed storage system 100 during stages of a group write transaction in accordance with embodiments of the disclosed technology. In FIGS. 2A-2D and other figures herein, certain components of the distributed storage system 100 and the storage nodes 104 of FIG. 1 are omitted for clarity. For example, in FIGS. 2A-2D, the persistent storage 115 is omitted from the first and second storage nodes 104a and 104b for convenience of illustration.

In FIGS. 2A-2D and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 2A:
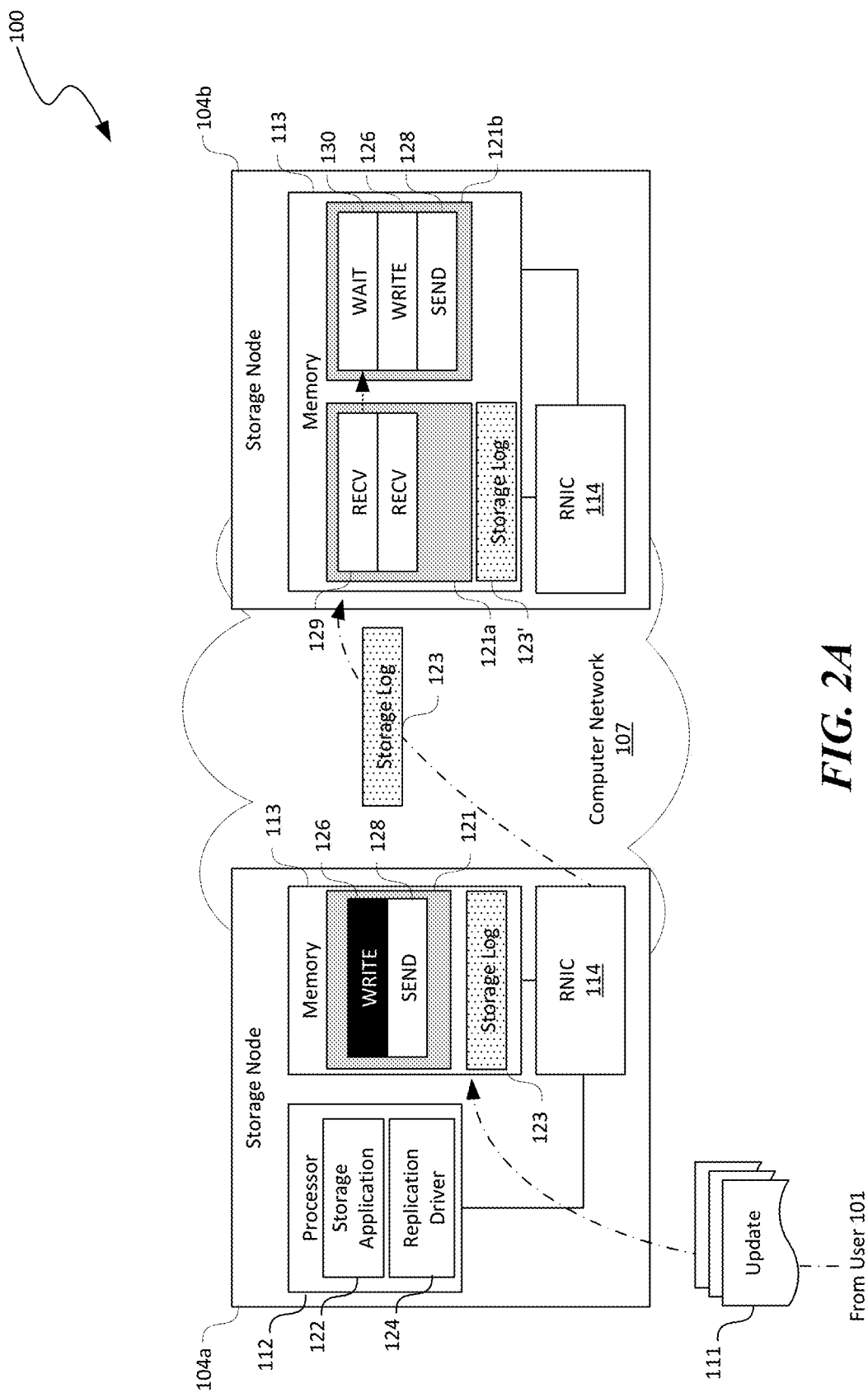
FIGS. 2A-2D are schematic diagrams illustrating certain hardware/software components of the distributed storage system of FIG. 1 during group-based data replication in accordance with embodiments of the disclosed technology.

As shown in FIG. 2A, the processor 112 at the first storage node 104a can execute suitable instructions, for example, from the memory 113 to provide a storage application 122 and a replication driver 124. The storage application 122 can be configured and executed by the processor 112 to facilitate storage, retrieval, modification, deletion, or other suitable data operations that can be performed on data objects 109 (FIG. 1) stored in the distributed storage system 100. The storage application 122 can be a standalone application or a web-accessible application. One example storage application is Google Drive provided by Google LLC of Mountain View, Calif.

The replication driver 124 can be configured to implement a set of group-based replication functions or primitives to facilitate the storage application 122 to perform data replicated transactions without involving the processor 112 at the replica storage nodes in accordance with embodiments of the disclosed technology. In particular, FIGS. 2A-2D illustrate stages of a group write primitive (gWRITE) that allows a caller (e.g., the storage application 122 at the first storage node 104a) to write data such as the storage log 123 into one or more memory regions of a group of remote storage nodes 104 (e.g., the second and third nodes 104b and 104c) without involving the processor 112 of the remote storage nodes 104, as described in more detail below.

As shown in FIG. 2A, the first storage node 104a is configured to interface with the client device 102 (FIG. 1) of the user 101. For instance, the first storage node 104a can receive an update 111 to a data object stored in the distributed storage system 100. In response, the first storage node 104a can store the received update as a storage log 123 in the memory 113. The first storage node 104a can also leverage one or more group replication primitives disclosed herein to replicate the received update 111 to other storage nodes in the replication group.

In one aspect of the disclosed technology, an event-based work request triggering mechanism between two RDMA communication channels, i.e., a queue pair (QP) of two RDMA connected working queues 121 at the storage nodes 104 can be used to automatically trigger RDMA data operations in the RNIC 114. For example, as shown in FIG. 2A, the memory 113 of the storage nodes 104 can each allocate one or more memory region in corresponding memory 113 for holding one or more working queues 121 of an RDMA channel or QP. For instance, the working queue 121 at the first storage node 104a can form a QP with a first working queue 121a at the second storage node 104b.

The working queues 121 can each contain one or more RDMA operations or "work requests" of different types. For instance, as shown in FIG. 2A, the working queue 121 at the first storage node 104a can include a WRITE and a SEND work requests 126 and 128. On the other hand, the second storage node 104b can include the first working queue 121a and a second working queue 121b. The first working queue 121a can include one or more RECV work requests 129 while the second working queue 121b can include a WAIT, WRITE, and SEND work requests 130, 126, and 128, respectively. The WAIT work request 130 is configured to wait for a completion of one or more work requests in the first working queue 121a before triggering other work requests in the second working queue 121b. In the illustrated example, the WAIT work request 130 is configured to wait for a completion of the first RECV working request 129 in the first working queue 121a, before automatically triggering the WRITE and SEND work requests 126 and 128 in the second working queue 121b.

In certain embodiments, the individual storage nodes 104 can pre-post various working requests in the corresponding working queues 121. For example, a replication driver 124 (not shown) or other suitable software components on the second storage node 104b can pre-post the RECV work requests 129 in the first working queue 121a and the WAIT, WRITE, and SEND working requests in the second working queue 121b. The replication driver 124 can also periodically replenish the first and second working queues 121a and 121b to maintain a preset number of work requests in the respective working queues 121. In other embodiments, the individual storage nodes 104 can also post the foregoing working requests in other suitable manners.

In accordance with embodiments of the disclosed technology, the RNIC 114 on the individual storage nodes 104 can periodically, continuously, or in other suitable manners monitor the corresponding working queues 121 and execute any work requests present in the working queues 121 in a first-in-first-out manner. For example, as shown in FIG. 2A, the RNIC 114 on the first storage node 104a can execute the WRITE work request 126 with before the SEND work request 128. By executing the WRITE work request 126 with parameters including, for example, a memory pointer to the storage log in the memory 113 in the first storage node 104a and a size of the storage log 123, the RNIC 114 at the first storage node 104a can write or transmit a copy of the storage log 123' to a memory location of the memory 113 at the second storage node 104b. In FIGS. 2A-4C, executing work requests are shown with dark backgrounds while executed work requests are shown with dashed borders. Work requests pending execution are shown in light backgrounds.

Even though the storage log 123' is now stored in the memory 113 of the second storage node 104b, the WRITE and SEND work requests 126 and 128 in the second queue 121b, however, do not have parameters (e.g., a local source address, size of data to be written, or a remote destination address) of the storage log 123' because these work requests 126 and 128 may be pre-posted to the second queue 121b. Since the WAIT work request 130 can only trigger work requests posted in advance, the RNIC 114 at the second storage node 104b can only forward a fixed size buffer of data at a pre-defined memory location (referred to herein as "fixed replication"). Fixed replication, however, can be insufficient for general storage systems that are flexible in memory management.

Figure 2B:
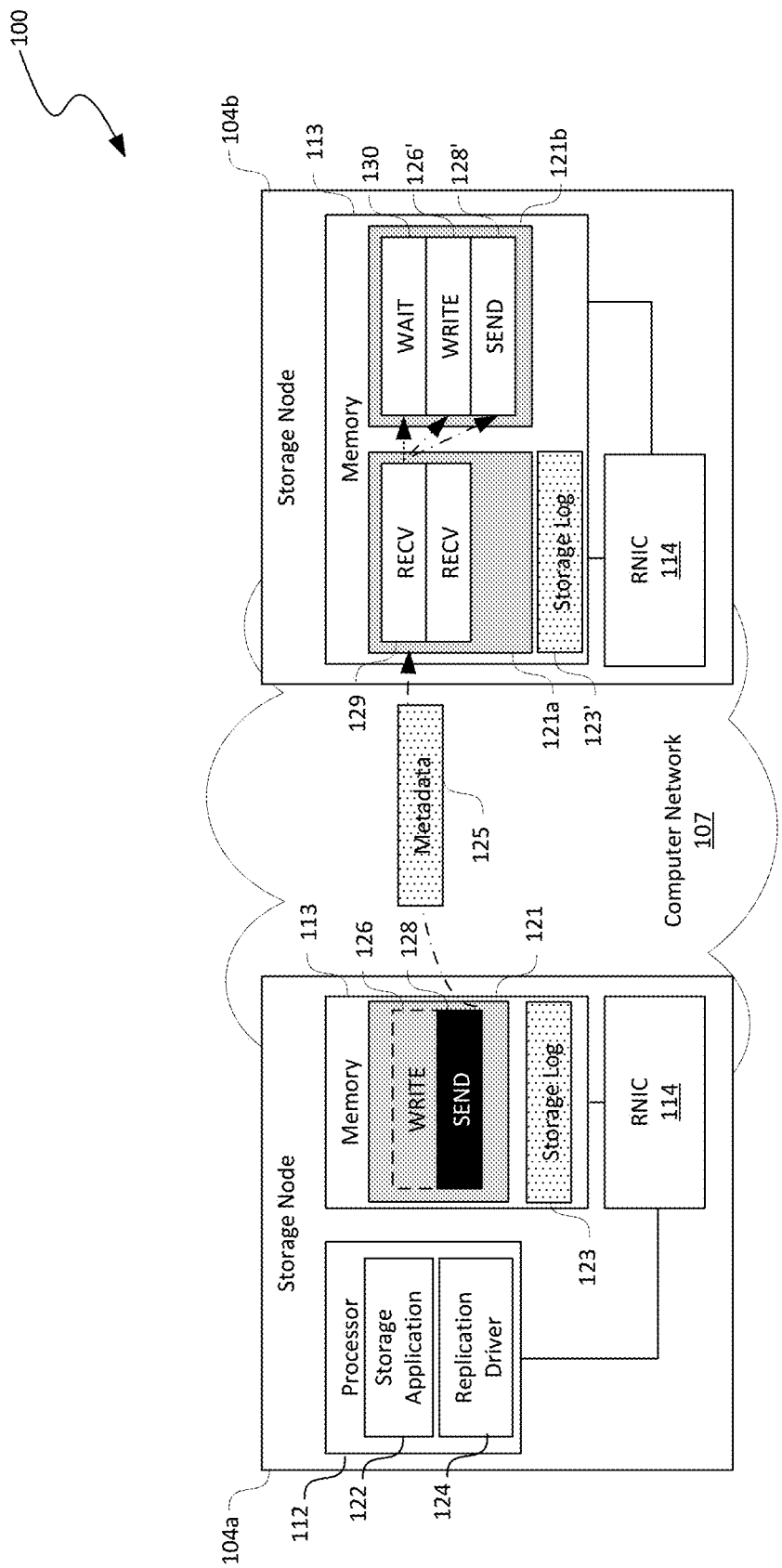

To address this limitation, another aspect of the disclosed technology is directed to remote work request manipulation for replicating arbitrary data. To enable remote work request manipulation, the first and second working queues 121a and 121b can be registered as RDMA-writable memory regions in the memory 113 of the second storage node 104b. Such RDMA-writable memory regions allow the first storage node 104a to modify memory descriptors (stored in a working queue structure) of pre-posted WRITE, READ, or other suitable types of work requests on the second storage node 104b. For example, as shown in FIG. 2B, before triggering the WAIT work request 130 in the second queue 121b on the second storage node 104b, the RNIC 114 on the first storage node 104a executes the SEND work request 128 to transmit metadata 125 containing parameters of the storage log 123' on the second storage node 104b to the RNIC 114 at the second storage node 104b. The RECV work request 129 in the first working queue 121a receives the metadata 125 and writes the metadata 125 into a memory region containing the second working queue 121b to modify suitable memory descriptors for the WRITE and SEND work requests 126' and 128' in the second working queue 121b. Once modified, the WRITE and SEND work requests 126' and 128' in the second working queue 121b can contain data representing, for example, a local source address of the storage log 123', a size of data to be written, or a remote destination address at the third storage node 104c (shown in FIG. 2C).

Figure 2C:
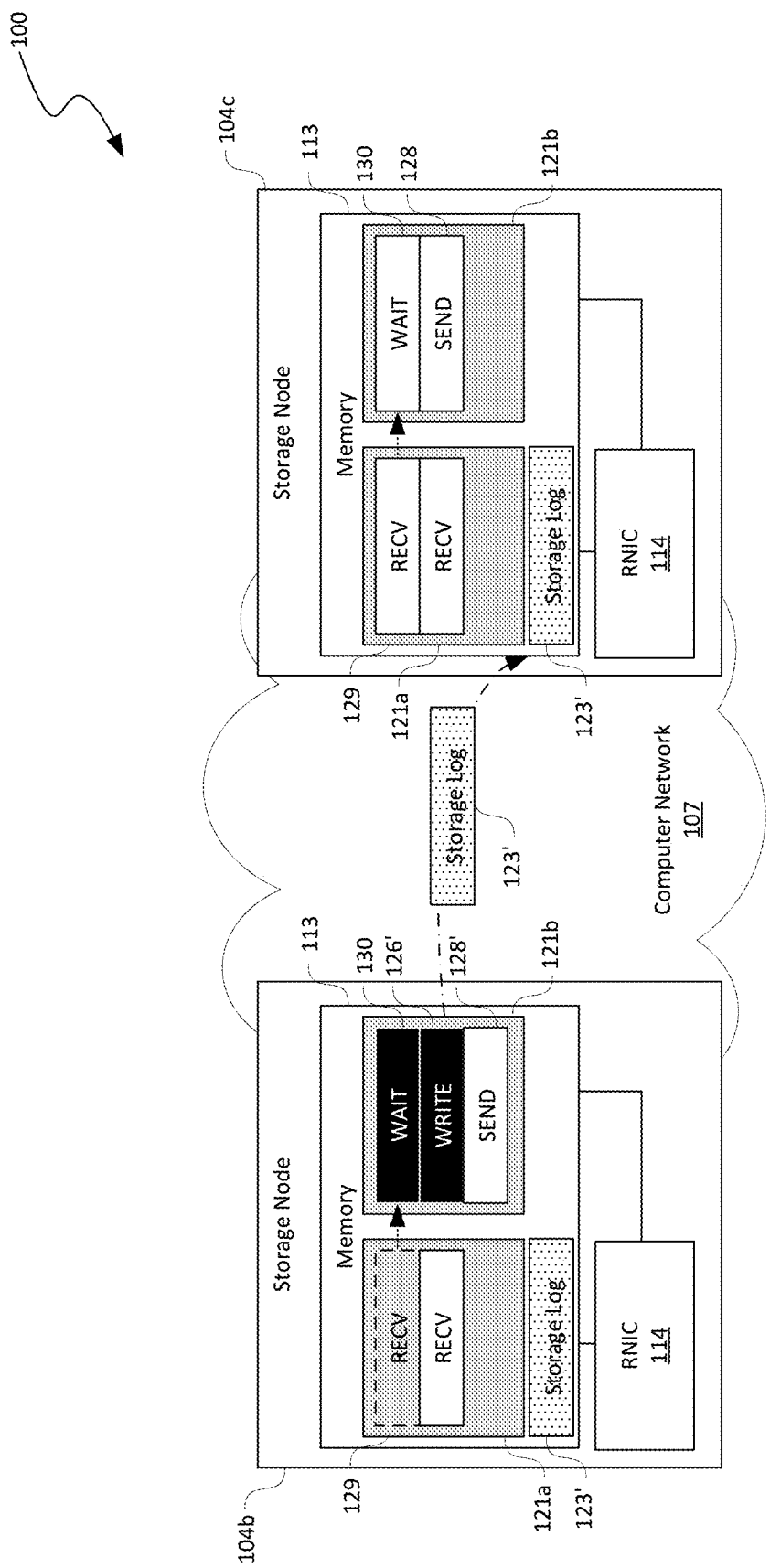

Once the RECV work request 129 is completed, as shown in FIG. 2C, the WAIT work request 130 in the second working queue 121b at the second storage node 104b can be automatically triggered. As a result, the RNIC 114 at the second storage node 104b executes the WRITE work request 126' to write another copy of the storage log 123' to a memory location in the memory 113 of the third storage node 104c. As such, the storage log 123 initially received from the user 101 can be propagated from the first storage node 104a to the second and third storage nodes 104b and 104c in sequence. Such propagation only involves executing work requests pre-posted in corresponding working queues 121 on each storage nodes 104 without involvement of the processor 102 (except a few cycles for pre-posting the work requests).

Figure 2D:
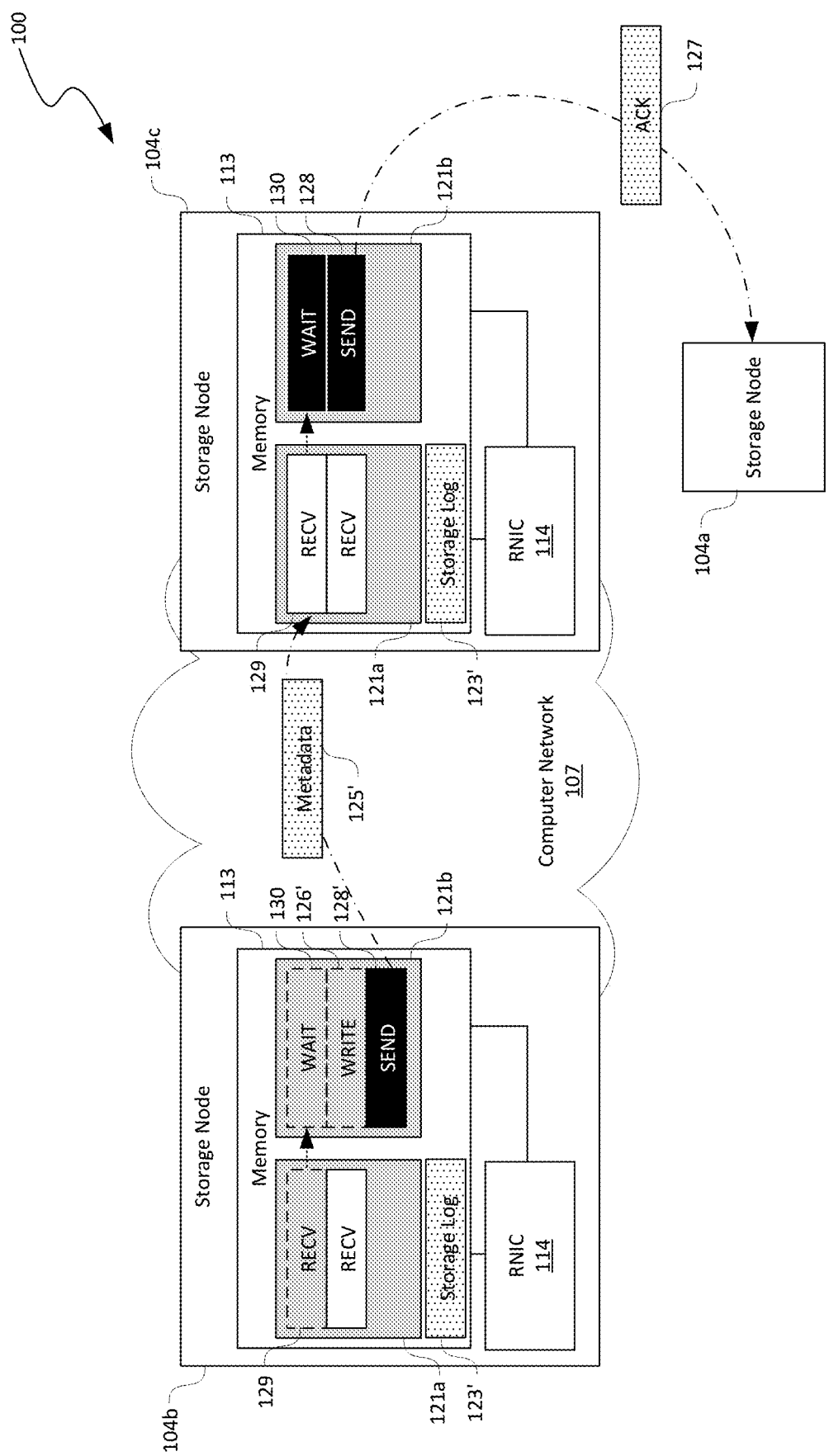

Several embodiments of the disclosed technology can also leverage a WAIT work request 130 at the second queue 121b of the third storage node 104c to bounce back an ACK to the first storage node 104a as a group operation ACK. For example, as shown in FIG. 2D, the RNIC 114 at the second storage node 104b can execute the SEND work request 128' to transmit the metadata 125' to the third storage node 104c. Upon completion of the RECV work request 129 at the first queue 121a of the third storage node 104c, the WAIT work request 130 at the second queue 121b of the third storage node 104c is triggered to execute the SEND work request 128. As a result, an ACK 127 can be transmitted to the first storage node 104a indicating that replication of the storage log 123 in the replication group has completed.

In many replicated storage systems, processors 112 of storage nodes 104 execute or commit a transaction by copying the storage log 123 corresponding to a replicated transaction from a log region to a persistent data region (e.g., the persistent storage 115 in FIG. 1). Several embodiments of the disclosed technology are directed to a group-based remote memory copy (gMEMCPY) primitive that allows the first storage node 104a to direct remote RNICs 114 to perform a memory copy on a corresponding memory 113 for given parameters, such as a data source address, destination address, and data size. When the first storage node 104a executes transactions via this primitive, on all other storage nodes 104 in the replication group, the RNICs 114 can copy the storage log 123 from a log region to a persistent data region without involving the processor 112. In particular implementation, the group-based remote memory copy primitive takes as input a replication group ID, a memory offset of a source region and a destination region, and a size of data being copied. When the gMEMCPY primitive is called, the RNICs 114 on the second and third storage nodes 104b and 104c perform memory copy for a given source and destination offset against the corresponding memory 113 without involving corresponding processor 112, as described in more detail below with reference to FIGS. 3A and 3B.

Figure 3A:
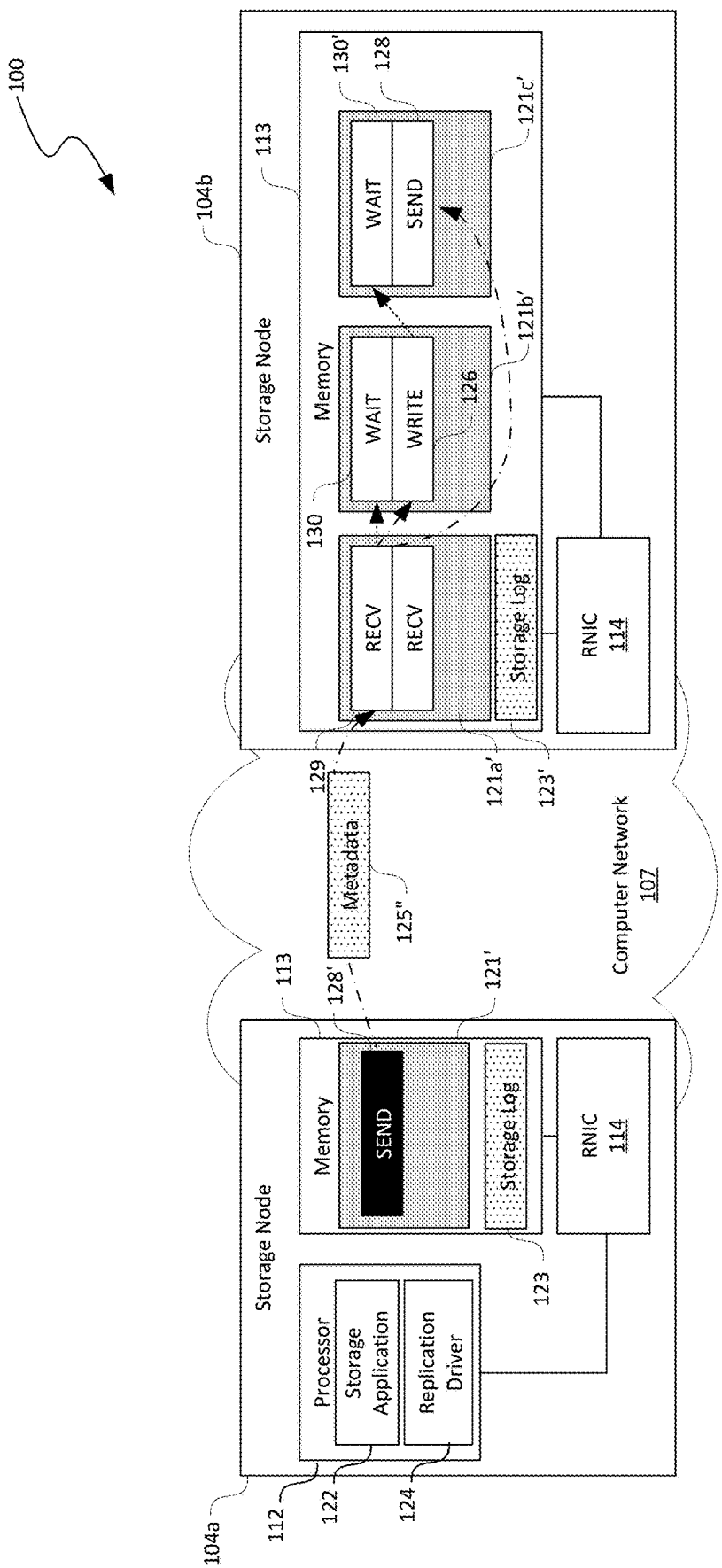
FIGS. 3A and 3B are schematic diagrams illustrating certain hardware/software components of the distributed storage system of FIG. 1 during memory WRITEs in accordance with embodiments of the disclosed technology.

As shown in FIG. 3A, additional QPs may be created on the storage nodes 104 for performing group memory copy operations locally on each of second and third storage nodes 104b and 104c. For example, the first storage node 104a can contain another queue 121' while the second storage node 104b can contain first, second, and third queues 121a'-12ac', respectively. In the illustrated example, the queue 121' on the first storage node 104a includes a SEND work request 128' configured to transmit or send metadata 125" to the second storage node 104b. The metadata 125" can include data representing, for example, a replication group ID, a memory offset of a source region and a destination region, and a size of data being copied. Upon receiving the metadata 125" from the first storage node 104a, the RECV work request 129 in the first queue 121a' of the second storage node 104b updates corresponding memory descriptors of the WRITE work request 126 in the second queue 121b and the SEND work request 128 in the third queue 121c'.

Figure 3B:
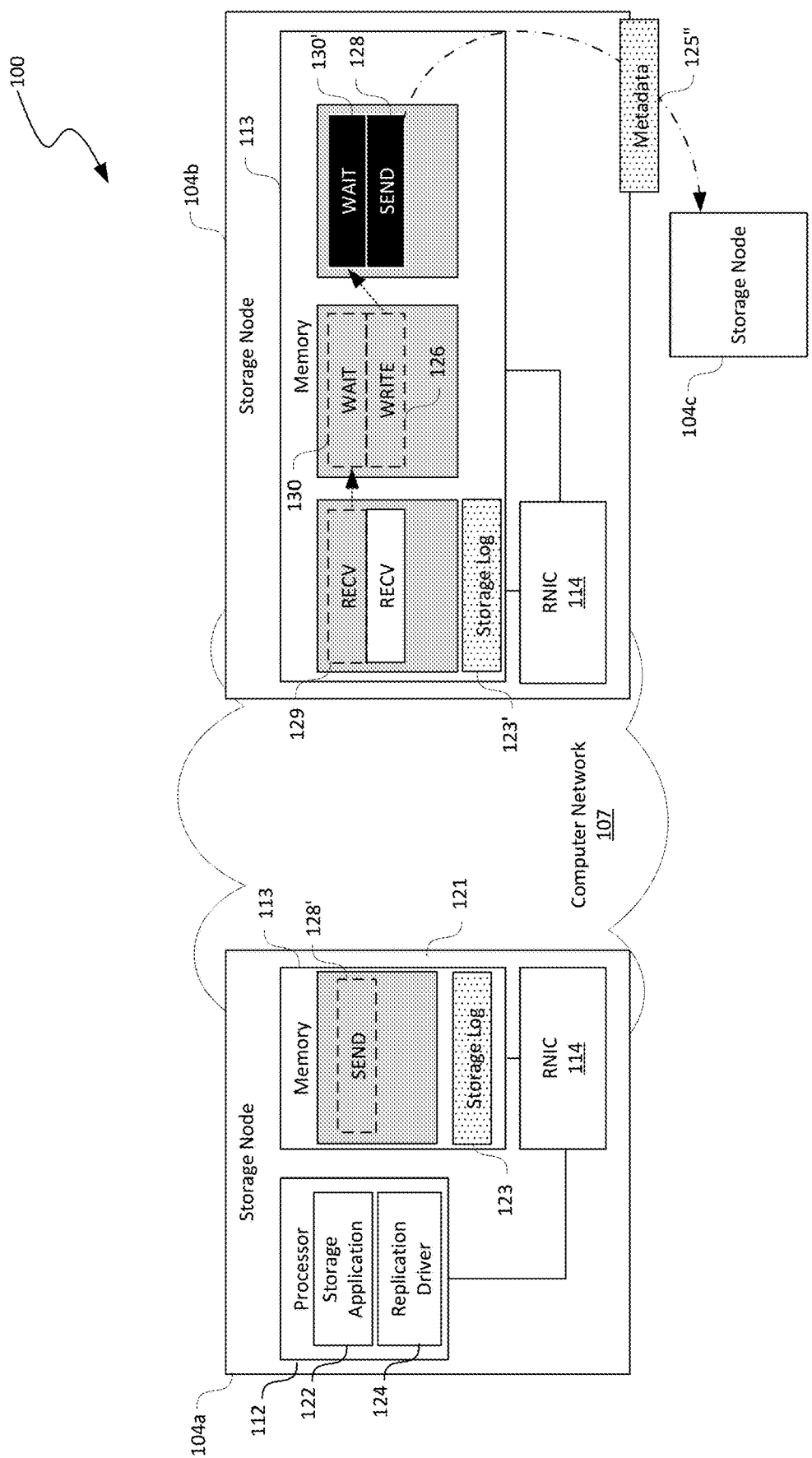

As shown in FIG. 3B, upon completion of the RECV work request 129 in the first queue 121a', the WAIT work request 130 in the second working queue 121b is triggered. In response, the RNIC 114 at the second storage node 104b executes the WRITE work request 126 for local memory copy. When the local memory copy is successfully completed, the RNIC 114 triggers the WAIT work request 130' in the third working queue 121c' and forwards the memory copy operation to the next node (e.g., the third storage node 104c) using the SEND work request 128 in the third working queue 121c to pass along the metadata 125".

To support durability of replicated transactions, data written with RDMA WRITE work requests need to maintain data integrity even in the event of system failure (e.g., power outage). However, conventional RDMA protocol implemented on RNICs may not guarantee durability. A destination RNIC sends an ACK in response to an RDMA WRITE work request as soon as any written data is stored in the volatile cache of the RNIC. As such, the written data can be lost on power outage before the data is flushed into NVM, e.g., the persistent storage 115 in FIG. 1.

Several embodiments of the disclosed technology are also directed to an RDMA FLUSH primitive that supports durability at the "NIC-level" with similar working queue configurations as those shown in FIGS. 3A and 3B. In particular implementations, the first storage node 104a can issue an RDMA FLUSH (gFLUSH) primitive, the RNIC 114 at the first storage node 104a can immediately issue a 0 byte RDMA READ command to the RNIC 114 at the second storage node 104b without waiting for an ACK from the second storage node 104b. Then the RNIC 114 at the second storage node 104b flushes the cache for the READ command and the RNIC 114 at the first storage node 104a provides an ACK after the 0 byte READ command is acknowledged. Similar to gWRITE, gFLUSH operations can also be propagated down the chain for durability across the storage nodes 104. In certain implementations, a gFLUSH commands can be issued by itself. In other embodiments, one or more gFLUSH commands can be interleaved with gWRITE or gMEMCPY operations. For instance, an interleaved gWRITE and gFLUSH operation on the second storage node 104b can first flush the cache and only then forward the gWRITE down the chain. As such, durable updates can be propagated in the order needed by the chain or between the first and second or third storage nodes 104.

To ensure data integrity during concurrent read-WRITEs, distributed replicated storage systems often use a locking mechanism for preventing other processes from modifying the same data objects. Several embodiments of the disclosed technology are also directed to a group compare-and-swap (gCAS) primitive configured to offload such lock management to the RNIC 114, as described in more detail below with reference to FIGS. 4A-4C.

In certain implementations, the gCAS primitive enables remote RNICs (e.g., RNICs 114 at the second and third storage nodes 104b and 104c) to perform compare-and-swap against a specified memory location in a corresponding memory 113 and update a value of in the memory location based on a result of the comparison. The first storage node 104a can acquire a logical group lock via this primitive without involving the processors 112 at the second and third storage nodes 104b and 104c.

Figure 4A:
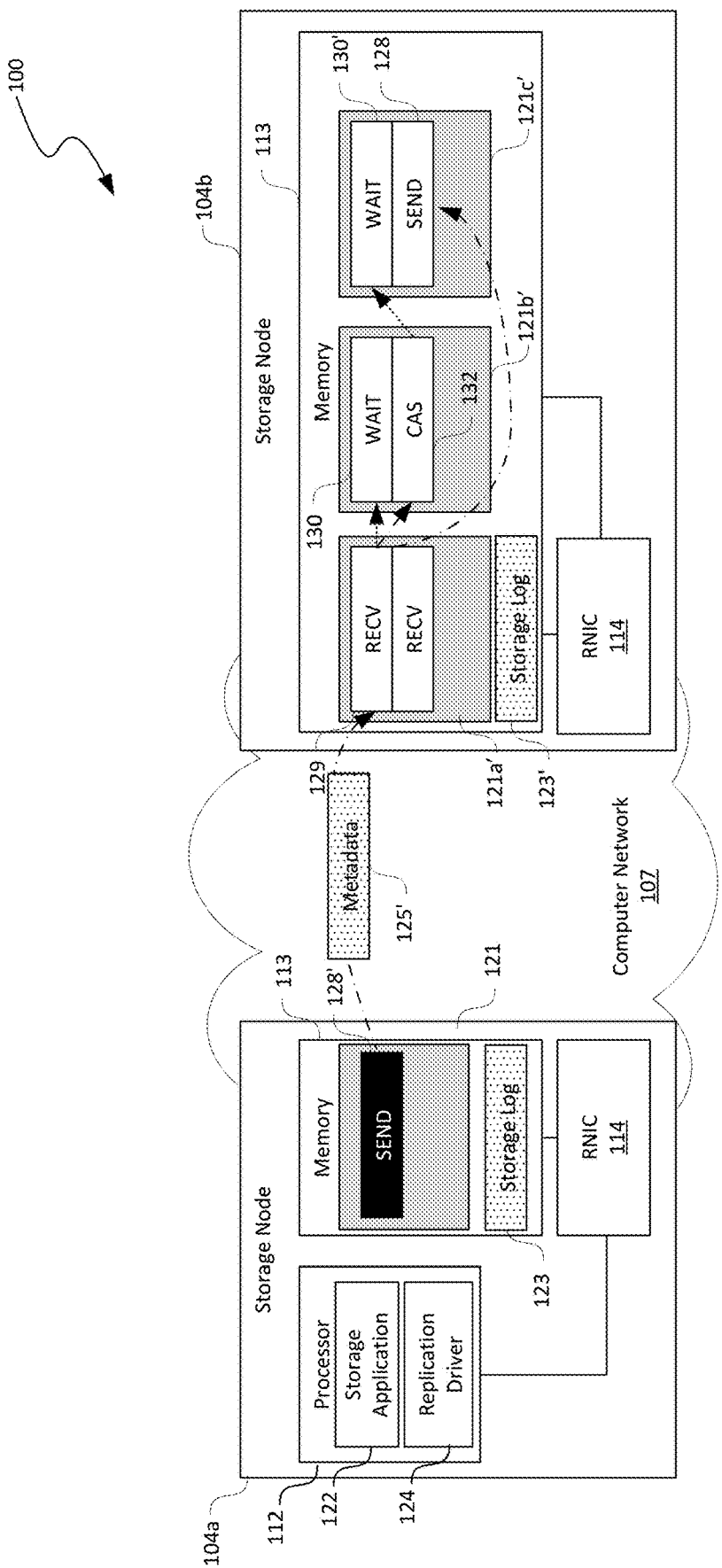
FIGS. 4A-4C are schematic diagrams illustrating certain hardware/software components of the distributed storage system of FIG. 1 during atomic operations in accordance with embodiments of the disclosed technology.

As shown in FIG. 4A, the first and second storage nodes 104a and 104b have generally similar configuration as those shown in FIG. 3A except that the second working queue 121b' contains a compare-and-swap (CAS) work request 132 instead of a WRITE work request 126. As shown in FIG. 4A, the RNIC 114 on the first storage node 104a can execute the SEND work request 128' to transmit metadata 125''' to the second storage node 104b. The metadata 125''' can include data representing a replication group ID, an offset of a memory location whose value is to be compared, an old value, and a new value, an execute map, a result map, and/or other suitable parameters. The execute and result map contains a data field for each node in the replication group. The first storage node 104a can specify whether each remote node (e.g., the second and third storage nodes 104b and 104c) has to execute the CAS operation on the execute map by, for example, marking the corresponding data field. Each remote node can update a result of locally performed CAS operation to the execute map and the first storage node 104a can receive the final execute map as an ACK of performing a gCAS operation.

Figure 4B:
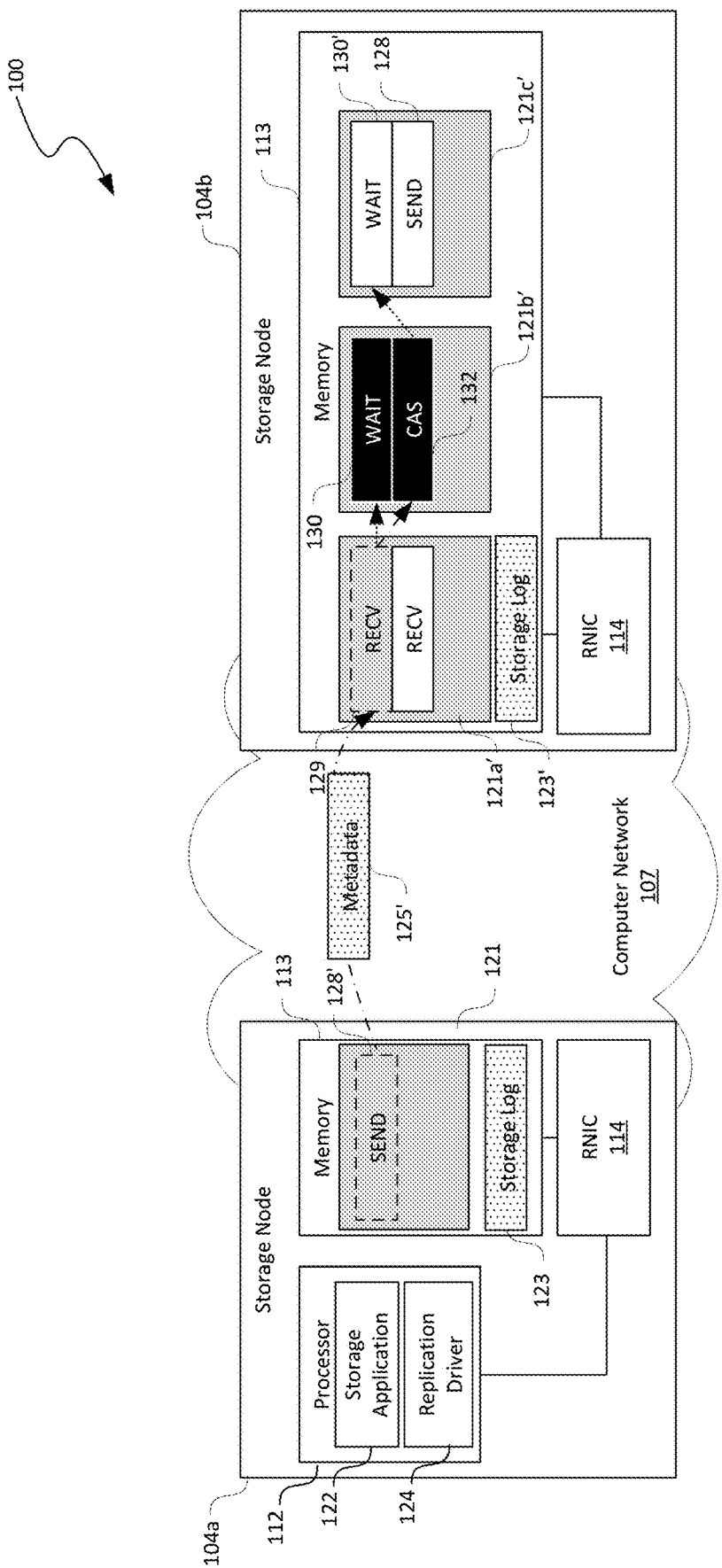
Figure 4C:
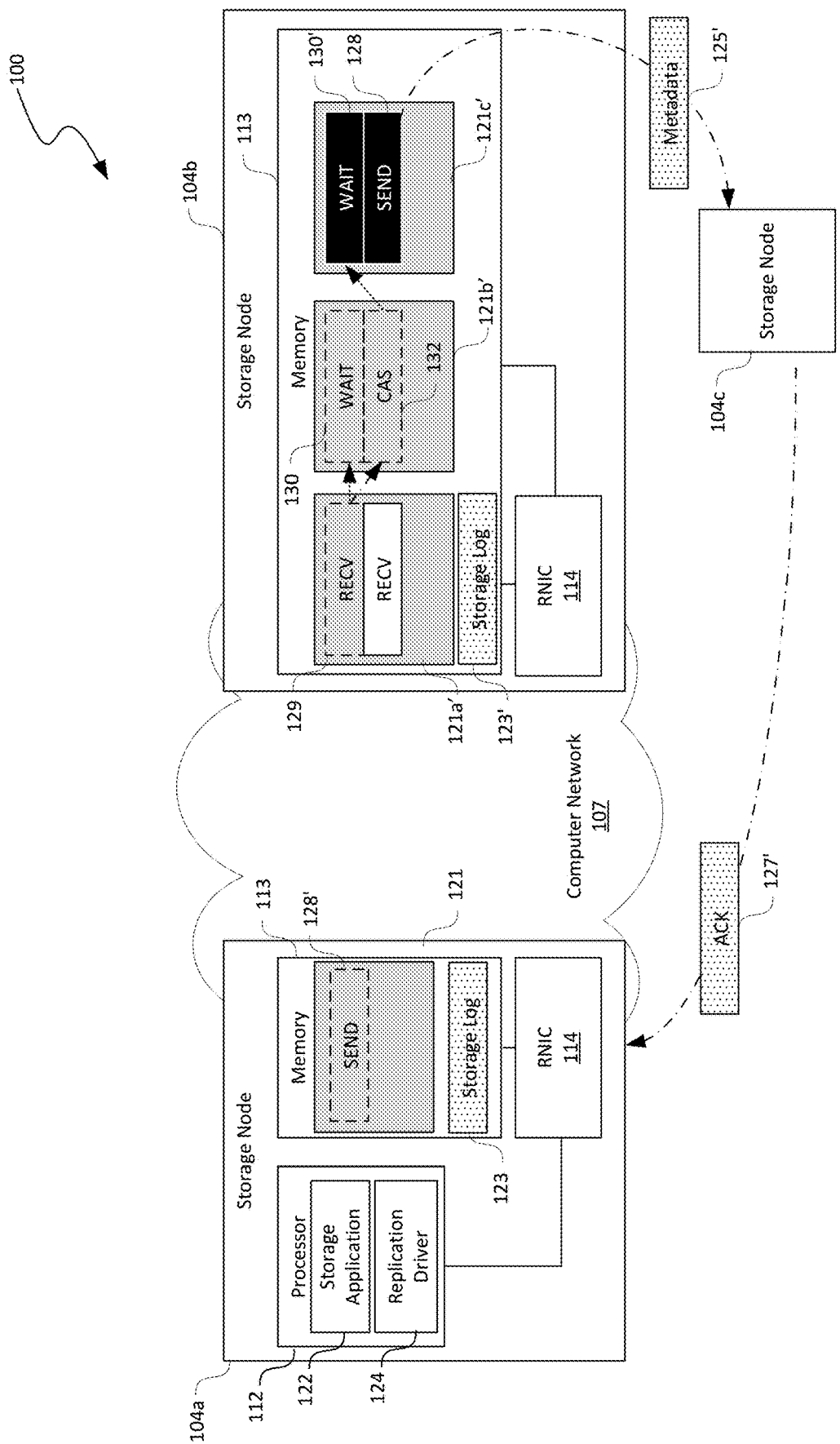

Also shown in FIG. 4A, when the RECV work request 129 in the first queue 121' of the second storage node 104b is consumed by the SEND work request 128' initiated by the first storage node 104a, the RNIC 114 at the second storage node 104b updates a memory descriptor of CAS and SEND work requests 132 and 128 in the second and third working queues 121b' and 121c', respectively. As shown in FIG. 4B, CAS, upon completion of the RECV work request 129, the WAIT work request 130 in the second queue 121b' is triggered to execute the CAS work request 132 and update a corresponding data field in the execute map. As shown in FIG. 4C, completion of the CAS work request 132 triggers the WAIT and SEND work requests 130' and 128 in the third queue 121c' to pass along the gCAS operation to the next storage node 104, e.g., the third storage node 104c. In the illustrated example, the third storage node 104c is the last one in the replication group. As such, the third storage node 104c can then forward the result execute map to the first storage node 104a as an ACK 127' using, for example, a WRITE_WITH_IMM work request (not shown) in a corresponding working queue.

Figure 5:
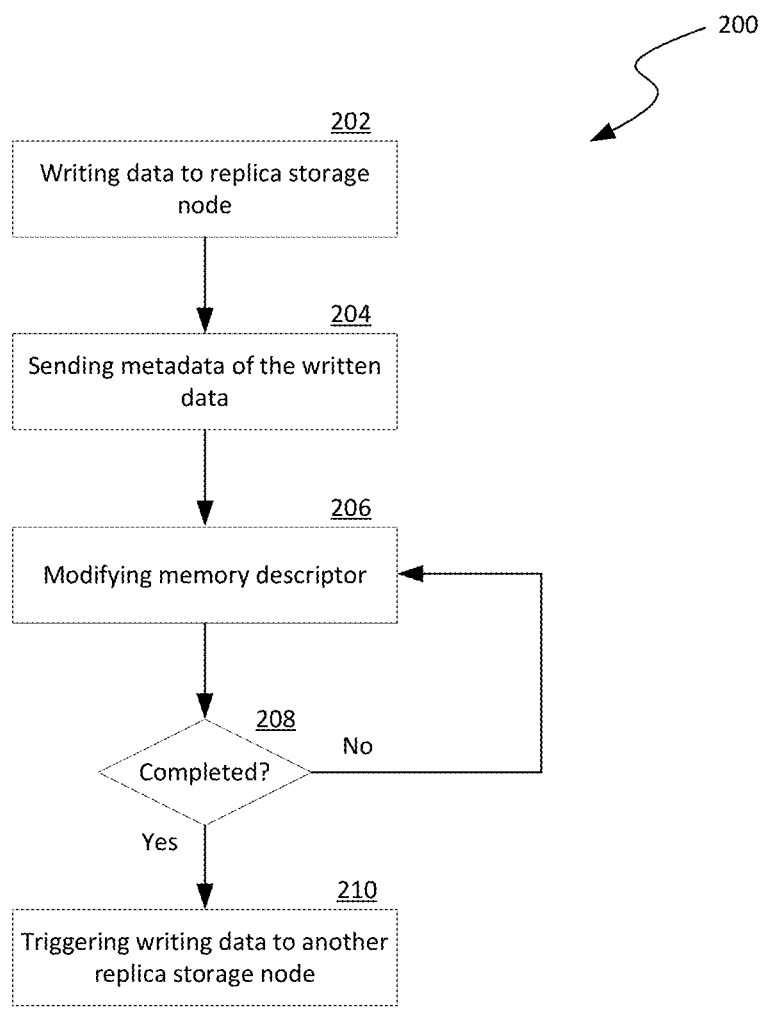
FIGS. 5 and 6 are flowcharts illustrating processes for group-based data replication in accordance with embodiments of the disclosed technology.

FIG. 5 is a flowchart illustrating a group-write process 200 for group-based data replication in accordance with embodiments of the disclosed technology. As shown in FIG. 5, the process 200 can include writing a block of data to a memory of a replica storage node via an RDMA network at stage 202. The block of data is written into a memory location of the memory at the replica storage node and has a data size. The process 200 can then include sending metadata of the written block of data to the replica storage node at stage 204. The metadata can include, for example, the memory location at which the written block of data is stored in the memory of the replica storage node and the corresponding data size. The process 200 can then include, with the metadata, modifying a memory descriptor that is a part of a data structure representing a pre-posted work request for writing a copy of the block of data to another replica storage node at stage 206. The process 200 can then include a decision stage 208 to determine whether the modification of memory descriptor is completed. In one embodiment, the modification is completed when a RECV work request registers a completion in a corresponding completion queue. In other embodiments, modification of the memory descriptor can be deemed complete according to other suitable criteria. In response to determining that the modification is compete, the process 200 can include automatically triggering writing a copy of the block of data from the replica storage node to another replica storage node in a replication group at stage 210. As such, operations shown in FIG. 5 can be repeated suitable times to replicate the block of data to all replica storage nodes in the replication group.

Figure 6:
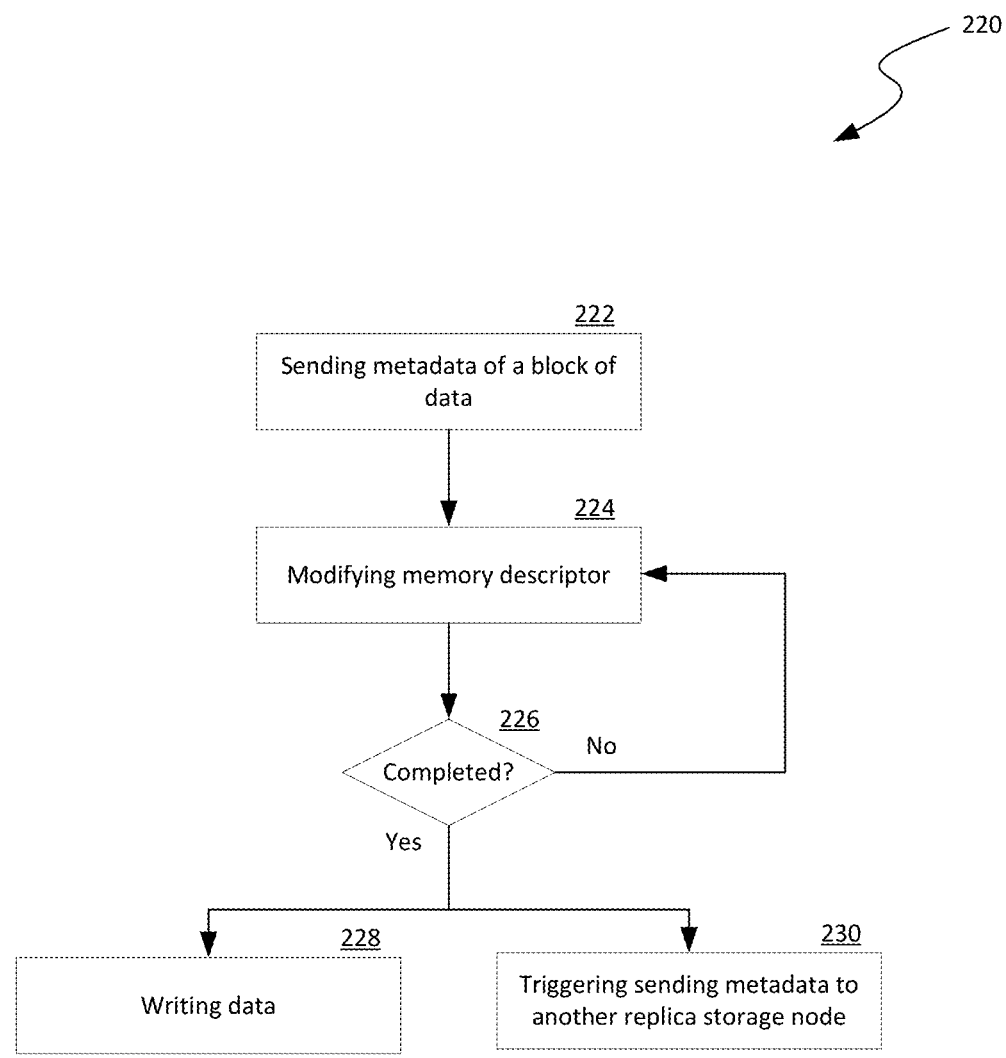

FIG. 6 is a flowchart illustrating a group-based memory write process 220 for group-based data replication in accordance with embodiments of the disclosed technology. As shown in FIG. 6, the process 220 can include sending metadata regarding a block of data to be moved from a source memory region to a destination memory region in a memory at a replica storage node at stage 222. The metadata can include, for example, memory offsets of the source and destination memory regions and a data size of the block of data. The process 220 can then include, with the metadata, modifying a memory descriptor that is a part of a data structure representing a pre-posted work request for sending a copy of the metadata to another replica storage node at stage 224. The process 220 can then include a decision stage to determine whether the modification is complete. In response to determining that the modification is complete, the process 220 can include writing the block of data from the source region to the destination region at stage 228 and triggering sending the metadata to another replica storage node at stage 230.

FIG. 7 is a computing device 300 suitable for certain components of the distributed storage system 100 in FIG. 1. For example, the computing device 300 can be suitable for the storage nodes 104 or the client device 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for data replication in a distributed storage system having a plurality of storage nodes interconnected by an remote direct memory access ("RDMA") network, the storage nodes individually having a processor, a memory, and an RDMA enabled network interface card ("RNIC") operatively coupled to one another, the method comprising:

writing, from a first RNIC at a first storage node, a block of data from a first memory at the first storage node to a second memory at a second storage node via a second RNIC interconnected to the first RNIC in the RDMA network;

sending, from the first RNIC to the second storage node, metadata representing a memory location and a data size of the written block of data in the second memory via the second RNIC;

performing, at the second storage node, modification of a memory descriptor in the second memory according to the metadata, the memory descriptor being a part of a data structure representing a pre-posted work request for writing a copy of the block of data to a third storage node; and upon completion of modifying the memory descriptor, writing, from the second RNIC, a copy of the block of data to a third memory at the third storage node via a third RNIC interconnected to the second RNIC in the RDMA network, thereby achieving replication of the block of data in the distributed storage system without using the processors at the second and third storage nodes.

2. The method of claim 1 wherein writing the block of data includes:

receiving, from a client device, data representing an update to a data object stored in the distributed storage system;

storing, in the first memory, a copy of the received data as the block of data at the first storage node; and executing, at the first RNIC, another data structure representing another work request for writing the block of data to the second storage node, the another work request having parameters representing the memory address and data size of the block of data to be written in the second memory of the second storage node.

3. The method of claim 1 wherein modifying the file descriptor includes:

receiving, at the second storage node, the sent metadata from the first RNIC;

identifying, at the second RNIC, the memory location containing data representing the memory descriptor; and updating, at the second memory, the memory descriptor at the identified memory location with the received metadata from the first RNIC.

4. The method of claim 1 wherein writing the copy of the block of data to the third memory includes:

determining whether the modification of the memory descriptor is completed; and in response to determining that the modification of the memory descriptor is completed, at the second RNIC, automatically triggering writing, from the second storage node, the copy of the block of data to the third memory without using the processor at the second storage node.

5. The method of claim 1 wherein writing the copy of the block of data to the third memory includes:
- determining whether the modification of the memory descriptor is completed; and
- in response to determining that the modification of the memory descriptor is completed, at the second RNIC, automatically triggering a conditional execution work request at the second storage node; and
- upon execution of the conditional execution work request at the second RNIC, writing, from the second storage node, the copy of the block of data to the third memory without using the processor at the second storage node.

6. The method of claim 1 wherein writing the copy of the block of data to the third memory includes:
- determining whether the modification of the memory descriptor is completed; and
- in response to determining that the modification of the memory descriptor is completed, at the second RNIC, automatically triggering a conditional execution work request at the second storage node, the conditional execution work request being pre-posted at the second storage node as a trigger for executing the pre-posted work request for writing the copy of the block of data to the third storage node; and
- upon execution of the conditional execution work request at the second RNIC, writing, from the second storage node, the copy of the block of data to the third memory without using the processor at the second storage node.

7. The method of claim 1, further comprising:
- upon completion of modifying the memory descriptor, sending, from the second RNIC, another metadata representing another memory address and data size of the written copy of the block of data in the third memory, to the third storage node via the third RNIC.

8. The method of claim 1, further comprising:
- at the third storage node,
  - determining whether the third storage node is a last storage node in a replication group that includes the first, second, and third storage nodes; and
  - in response to determining that the third storage node is a last storage node in a replication group, transmitting a notification representing an acknowledgement of receiving a copy of the block of data at the second and third storage node to the first storage node upon receiving the sent metadata from the second storage node.

9. The method of claim 8, further comprising:
- at the first storage node, upon receiving the notification representing the acknowledgement from the third storage node, sending additional metadata to the second storage node for committing the block of data to a persistent storage in the second storage node, the additional metadata including data representing a replication group ID, a memory offset of a memory region and a destination memory region, and a size of the block of data being copied; and
- at the second storage node, upon receiving the additional metadata,
  - updating another memory descriptor of another data structure representing another pre-posted work request for writing the copy of the block of data to the persistent storage at the second storage node; and
  - upon completion of updating the another memory descriptor, automatically triggering, by the second RNIC, the another pre-posted work request to write the copy of the block of data to the persistent storage at the second storage node.

10. A method for data replication in a distributed storage system having a plurality of storage nodes interconnected by an remote direct memory access ("RDMA") network, the storage nodes individually having a processor, a memory, and an RDMA enabled network interface card ("RNIC") operatively coupled to one another, the method comprising:
- sending, from a first RNIC at a first storage node, metadata to a memory at a second storage node via a second RNIC interconnected to the first RNIC in the RDMA network, the metadata representing memory offsets of a source region and a destination region and a data size of data to be moved;
- receiving, at the second storage node, the sent metadata from the first storage node;
- performing, at the second storage node, modification of a memory descriptor in the memory according to the metadata, the memory descriptor being a part of a data structure representing a pre-posted work request for writing a block of data from a first memory region to a second memory region in the memory of the second storage node; and
- upon completion of modifying the memory descriptor, automatically triggering writing, by the second RNIC, a block of data having the data size from the source region of the memory to the destination region of the memory at the second storage node according to the corresponding memory offsets included in the metadata without using the processor for the writing operation at the second storage node.

11. The method of claim 10 wherein performing the modification includes:
- identifying, at the second RNIC, the memory location containing data representing the memory descriptor; and
- updating, at the memory, the memory descriptor at the identified memory location with the received metadata from the first RNIC.

12. The method of claim 10 wherein performing the modification includes:
- identifying, at the second RNIC, the memory location containing data representing the memory descriptor; and
- replacing current data at the identified memory location with the received metadata from the first RNIC.

13. The method of claim 10 wherein:
- the memory descriptor is a first memory descriptor; and
- the method further includes performing, at the second storage node, another modification of a second memory descriptor in the memory of the second storage node according to the metadata, the second memory descriptor being a part of a data structure representing a pre-posted work request for sending a copy of the metadata to another memory at a further storage node via the RDMA network.

14. The method of claim 10 wherein:
- the memory descriptor is a first memory descriptor; and
- the method further includes:
  - performing, at the second storage node, another modification of a second memory descriptor in the memory of the second storage node according to the metadata, the second memory descriptor being a part of a data structure representing a pre-posted work request for sending a copy of the metadata to another memory at a further storage node via the RDMA network; and
  - upon completion of writing the block of data from the source region to the destination region in the memory at the second storage node, automatically triggering, at the second RNIC, execution of the pre-posted work request for sending a copy of the metadata to another memory.

15. The method of claim 10 wherein:
the memory descriptor is a first memory descriptor of a pre-posted first work request in a first working queue in the memory of the second storage node; and
the method further includes performing, at the second storage node, another modification of a second memory descriptor in the memory of the second storage node according to the metadata, the second memory descriptor being a part of a data structure representing a pre-posted second work request in a second working queue at the second storage node, the second work request being configured to send a copy of the metadata to another memory at a further storage node via the RDMA network.

16. A server in a distributed storage system having a plurality of servers interconnected by a remote direct memory access ("RDMA") network, the server comprising:
a processor;
a memory; and
an RDMA enabled network interface card ("RNIC") operatively coupled to one another, wherein the memory containing instructions executable by the processor to cause the server to:
write, with the RNIC, a block of data from the memory to another memory at another server via another RNIC interconnected to the RNIC in the RDMA network, the block of data representing an update to a data object stored in the distributed storage system;
upon completion of writing the block of data to the another server, send, from the RNIC to the another server, metadata representing a memory location and a data size of the written block of data in the another memory of the another server via the RDMA network; and
wherein the sent metadata is written into a memory location containing data representing a memory descriptor that is a part of a data structure representing a pre-posted work request configured to write a copy of the block of data to a further server via the RDMA network.

17. The server of claim 16 wherein:
the memory of the server contains a working queue having a WRITE work request; and
wherein execution of the WRITE work request by the RNIC writes the block of data from the memory to the another memory at another server.

18. The server of claim 16 wherein:
the memory of the server contains a working queue having a WRITE work request and a SEND work request in sequence;
wherein execution of the WRITE work request by the RNIC writes the block of data from the memory to the another memory at another server; and
wherein execution of the SEND work request sends the metadata to the another server.

19. The server of claim 16 wherein:
the memory of the server contains a working queue having a SEND work request;
the another memory of the another server contains another working queue having a RECV work request corresponding to the SEND work request; and
wherein the SEND and RECV work requests are configured to cooperate to send the metadata to the another server.

20. The server of claim 16 wherein the memory contains additional instructions executable by the processor to cause the server to:
receive, from the further server, a notification of acknowledgement indicating that both the another and further servers have a copy of the block of data; and
in response to receiving the notification, executing, at the RNIC, another SEND work request instructing the another and further servers to move the corresponding copy of the block of data from a source region to a destination region in the corresponding memories.

* * * * *